United States Patent
Wang et al.

(10) Patent No.: US 10,506,507 B2
(45) Date of Patent: Dec. 10, 2019

(54) WIRELESS ACCESS POINT SELECTION BASED ON A CONNECTION PLAN

(71) Applicants: Hewlett Packard Enterprise Development LP, Houston, TX (US); Shuai Wang, Beijing (CN); Jun Qing Xie, Beijing (CN); Xunteng Xu, Beijing (CN); Qun Yang Lin, Beijing (CN)

(72) Inventors: Shuai Wang, Beijing (CN); Jun Qing Xie, Beijing (CN); Xunteng Xu, Beijing (CN); Qun Yang Lin, Beijing (CN)

(73) Assignee: Hewlet Packard Enterprise Development LP, Houston, TX (US)

(*) Notice: Subject to any disclaimer, the term of this patent is extended or adjusted under 35 U.S.C. 154(b) by 17 days.

(21) Appl. No.: 15/307,640

(22) PCT Filed: Apr. 30, 2014

(86) PCT No.: PCT/CN2014/076597
§ 371 (c)(1),
(2) Date: Oct. 28, 2016

(87) PCT Pub. No.: WO2015/165075
PCT Pub. Date: Nov. 5, 2015

(65) Prior Publication Data
US 2017/0064622 A1 Mar. 2, 2017

(51) Int. Cl.
*H04L 12/26* (2006.01)
*H04W 48/20* (2009.01)
(Continued)

(52) U.S. Cl.
CPC ........... *H04W 48/20* (2013.01); *H04W 24/02* (2013.01); *H04W 76/10* (2018.02); *H04W 88/08* (2013.01); *H04W 92/12* (2013.01)

(58) Field of Classification Search
CPC ..... H04W 24/08; H04W 24/10; H04W 88/08; H04W 88/02; H04W 24/02
See application file for complete search history.

(56) References Cited

U.S. PATENT DOCUMENTS 7,783,284 B1 8/2010 Laux et al.
2002/0083429 A1* 6/2002 Rozenfeld ........... H04L 12/2876
717/174
(Continued)

FOREIGN PATENT DOCUMENTS

CN 10-1836428 A 9/2010
CN 10-1951663 A 1/2011
(Continued)

OTHER PUBLICATIONS

Wi-Fi Alliance, Hotspot 2.0 (Release 2) Technical Specification, Version 1.2, 2016, 207 pages.
(Continued)

*Primary Examiner* — Atique Ahmed
(74) *Attorney, Agent, or Firm* — Hewlett Packard Enterprise Patent Department

(57) ABSTRACT

An apparatus includes a display, a wireless communication device, an input device, and a processor. The processor to provide a first connection plan and a second connection plan via the display to a user. The first connection plan identifies a first set of rules of wireless access point selection and the second connection plan identifies a second set of rules for wireless access point selection. The processor also to receive a selection corresponding one of the first connection plan and the second connection plan from the user via the input device and to select one of a first wireless access point and a second wireless access point based on first network performance data of the first wireless access point, second network performance data of the second wireless access point, and the selection. The processor further to establish a
(Continued)

network connection with the selected wireless access point via the wireless communication device.

18 Claims, 4 Drawing Sheets

(51) Int. Cl.
*H04W 76/10* (2018.01)
*H04W 24/02* (2009.01)
*H04W 88/08* (2009.01)
*H04W 92/12* (2009.01)

(56) References Cited

U.S. PATENT DOCUMENTS

| | | | | |
|---|---|---|---|---|
| 2004/0082327 | A1* | 4/2004 | Kim | H04W 48/20 |
| | | | | 455/435.2 |
| 2006/0025149 | A1* | 2/2006 | Karaoguz | H04N 21/4126 |
| | | | | 455/452.2 |
| 2010/0029273 | A1* | 2/2010 | Bennett | H04W 8/26 |
| | | | | 455/435.2 |
| 2010/0083121 | A1 | 4/2010 | Famolari et al. | |
| 2010/0110921 | A1 | 5/2010 | Famolari et al. | |
| 2010/0177711 | A1* | 7/2010 | Gum | H04W 48/18 |
| | | | | 370/329 |
| 2011/0110354 | A1* | 5/2011 | Jiang | H04L 47/10 |
| | | | | 370/338 |
| 2011/0216692 | A1* | 9/2011 | Lundsgaard | H04W 48/20 |
| | | | | 370/328 |
| 2011/0286437 | A1* | 11/2011 | Austin | H04W 4/02 |
| | | | | 370/338 |
| 2012/0084184 | A1* | 4/2012 | Raleigh | H04L 12/5691 |
| | | | | 705/30 |
| 2012/0197765 | A1* | 8/2012 | Kim | G06Q 30/0601 |
| | | | | 705/27.1 |
| 2013/0007853 | A1 | 1/2013 | Gupta et al. | |
| 2013/0132854 | A1* | 5/2013 | Raleigh | G06F 3/0482 |
| | | | | 715/738 |
| 2013/0223423 | A1* | 8/2013 | Lee | H04W 48/16 |
| | | | | 370/338 |
| 2013/0322329 | A1 | 12/2013 | Visuri et al. | |
| 2013/0326594 | A1 | 12/2013 | Hanson et al. | |
| 2014/0233406 | A1* | 8/2014 | Chhabra | H04W 48/14 |
| | | | | 370/252 |

FOREIGN PATENT DOCUMENTS

| | | |
|---|---|---|
| CN | 10-2137458 A | 7/2011 |
| CN | 10-3384409 A | 11/2013 |

OTHER PUBLICATIONS

International Search Report and Written Opinion received for PCT Patent Application No. PCT/CN2014/076597, dated Jan. 21, 2015, 9 pages.
International Preliminary Report on Patentability received for PCT Patent Application No. PCT/CN2014/076597, dated Nov. 10, 2016, 8 pages.
IEEE Std 802.11, IEEE Standard for Information technology, Telecommunications and information exchange between systems Local and metropolitan area networks, Part 11: Wireless LAN Medium Access Control (MAC) and Physical Layer (PHY) Specifications, IEEE Computer Society, Mar. 2012, 2793 pages.
"W-fi in Heterogeneous Networks," Ericsson White Paper, Jun. 24, 2013, http://www.ericsson.com/res/docs/whitepapers/wp-wi-fi-in-heterogeneous-networks.pdf >.

* cited by examiner

WIRELESS ACCESS POINT SELECTION BASED ON A CONNECTION PLAN

BACKGROUND

Wireless technologies, such as Wi-Fi, have widely adapted in various kinds of wireless computing devices, such as tablet computers, smart phones, laptop computers, etc. A wireless computing device may connect to a network, such as a local area network (LAN) or the Internet, via a wireless access point.

BRIEF DESCRIPTION OF THE DRAWINGS

Some examples of the present application are described with respect to the following figures.

DETAILED DESCRIPTION

As described above, a wireless computing device may connect to a network, such as a local area network (LAN) or the Internet, via a wireless access point (AP). In some cases, a plurality of wireless APs may be in the reception range of the wireless computing device. A software application, such as a connection manager, may automatically connect the wireless computing device to a particular wireless AP that the wireless computing device has connected to most recently or most frequently. However, the selection of the particular wireless AP does not take into account what activities the user is trying to accomplish. For example, the user may wish to transmit some files quickly. A wireless AP that has the highest transmission data rate is desirable. But the particular wireless AP may not have the highest transmission data rate among the available wireless APs. Thus, the user may transmit the files at a reduced speed or the user may manually identify the AP with the highest transmission data rate, which is time consuming. Accordingly, the user experience is negatively affected.

Examples described herein address the above challenges by providing a plurality of connection plans to a user at a wireless computing device. Each connection plan may correspond to a distinct set of rules of wireless AP selection. The user may select a particular connection of the plurality of connection plans. Based on the selected connection plan, the wireless computing device may examine network performance data of available wireless APs. The wireless computing device may establish a connection with a wireless AP that has network performance data satisfying the selected connection plan. In this manner, examples described herein may provide a better user experience.

Figure 1:
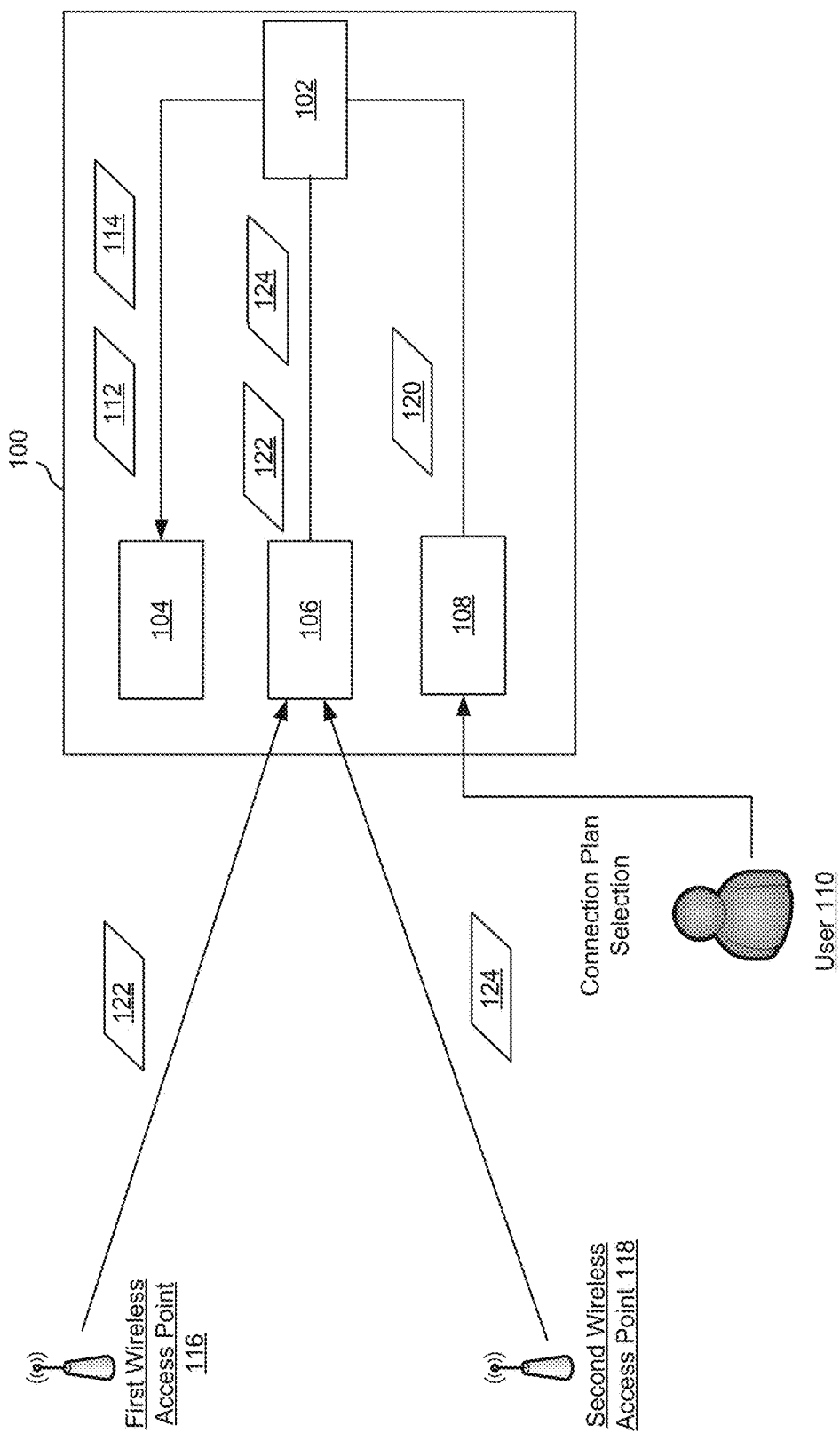
FIG. 1 is a block diagram of an example computing device for providing connection plans to a user.

Referring now to the figures, FIG. 1 is a block diagram of an example computing device 100 for providing connection plans to a user. Computing device 100 may be a wireless computing device. As used herein, a wireless computing device may be a computing device that transmits and/or receives data using radio waves. Computing device 100 may be, for example, a tablet computer, a laptop computer, a desktop computer, a mobile phone, an electronic book reader, or any other electronic device suitable to transmit and/or receive data wirelessly. Computing device 100 may include a processor 102, a display 104, a wireless communication device 106, and an input device 108.

Processor 102 may be a central processing unit (CPU), a semiconductor-based microprocessor, and/or other hardware devices suitable for retrieval and execution of instructions stored in computer-readable storage medium (not shown). Processor 102 may fetch, decode, and execute instructions to provide at least one connection plan to a user and establish a network connectin with a wireless AP based on a selectin of a connection plan.

Display 104 may be any electronic device for visual presentation of data. Display 104 may be, for example, a liquid-crystal display (LCD), touchscreen display device, organic light-emitting diode (OLED) display, or any electronic device suit to visually display data. Wireless communication device 106 may be any electronic device that is suitable to transmit and/or receive data using a wireless communication protocol, such as an Institute of Electrical and Electronics Engineers (IEEE) 802.11 protocol, the Bluetooth protocol, etc. In some examples, wireless communication device 106 may be a transceiver compliant with the IEEE 802.11u protocol. Input device 108 may be any electronic device suitable to provide data or control signals to a processing system such as processor 102. Input device 108 may be, for example, a keyboard, a touchscreen, a mouse, a joystick, etc. In some examples, display 104 and input device 108 may be a single device, such as a touchscreen. In some examples, display 104 and input device 108 may be distinct devices.

During operation, when a user 110 is to access a network or the Internet via computing device 100, computing device 100 may provide a plurality of connection plans, such as a first connection plan 112 and a second connection plan 114, to user 110 via display 104. For example, user 110 may select a web browsing software application (e.g., processor-executable instructions) via input device 108. In response to the selection of the web browsing software application, processor 102 may provide a first connection plan 112 and a second connection plan 114 via display 104 automatically. As used herein, a connection plan may correspond to a set of rules for wireless access point selection. First connection plan 112 may correspond to a first set of rules for wireless AP selection. Second connection plan 114 may correspond to a second set of rules for wireless AP selection. The second set of rules may be different from the first set of rules. Each set of rules may indicate at least one distinct network performance parameter that is used as a criterion for wireless AP selection.

Connection plans 112 and 114 may be independent of a wireless AP, such as a first wireless AP 116 or a second wireless AP 118. That is, selection of a connection plan does not directly correspond to a selection of a particular wireless AP. As described in more detail below, wireless AP selection may be performed subsequent to a selection of a connection plan. When a connection plan is initially selected, a set of rules corresponding to the selected connection plan may be used to determine a selection of a wireless AP. Different wireless AP may be selected at different times even though the same connection plan is selected based on availability of wireless APs, network conditions, traffic load of each available wireless AP, etc.

Each connection plan may indicate to user 110 a distinct criterion that is used to select a wireless AP. For example, first connection plan 112 may indicate that first connection plan 112 is performance oriented. When first connection plan 112 is selected, a wireless AP that has the fastest transmission data rate relative to other available wireless APs may be selected. Second connection plan 114 may indicate that second connect on plan 114 is a power oriented. When second connection plan 114 is selected, a wireless AP that needs the lowest transmission power from computing device 100 relative to other available wireless APs may be selected. Thus, user 110 may not need to manually select a wireless AP and user 110 may not need have technical knowledge to have a suitable wireless AP selected. Accordingly, a better user experience is achieved.

When first connection plan 112 and second connection plan 114 are presented to user 110 via display 104. User 110 may select one of first connection plan 112 and second connection plan 114 via input device 108 based on network related activities that user 110 is to perform via computing device 100. Selection data 120 corresponding to connection plan selection of user 110 may be transmitted from input device 108 to processor 102. Based on selection data 120, processor 102 may examine network performance data of wireless APs in communication range of computing device 100. For example, processor 102 may examine first network performance data 122 of first wireless AP 116 and second network performance data 124 of second wireless AP 118. Network performance data 122 and 124 may indicate values of at least one network performance parameter of wireless APs 116 and 118, respectively. Wireless APs 116 and 118 may transmit network performance data 122 and 124 respectively to computing device 100 as beacon messages.

Examples of network performance parameters of a wireless AP are illustrated below in Table 1:

TABLE 1

| Parameter Name | Description |
| --- | --- |
| Performance related parameter(s) | |
| Base station subsystem (BSS) load element | IEEE 802.1e function that provides an indication of how much data a wireless AP is transmitting/receiving |
| Operation class | A list of channels that a wireless AP can operate on |
| Wide area network metrics | Includes status, whether symmetric, "at capacity", uplink speed, downlink speed, uplink load, downlink load |
| Data rate | (Radiotap) transmission (TX)/reception (RX) data rate, reception data rate |
| Channel frequency | (Radiotap) TX/RX frequency (e.g., in megahertz or gigahertz) |
| Channel type | (Radiotap) flags |
| Power related parameter(s) | |
| Signal strength indicator | Receiving signal strength |
| Authentication related parameters | |
| Service set identifier (SSID) | Identification for a network or a wireless AP |
| Homogeneous extended SSID (HESSID) | Identifies a homogenous SSID or zone of coverage, using a media access control (MAC) address from a wireless AP |
| Roaming consortium organization identifier (OI) | A beacon has space for 3 OIs, of which one should be a wireless AP operator's OI |
| Robust secure network (RSN) element | Indicate Wi-Fi protected access 2 (WPA 2)-enterprise for Passpoint |
| RSN authentication and key management (AKM) list | Indicate advanced encryption standard (AES) for Passpoint |
| Network access identifier (NAI) realm list | A list of NAIs for reachable service providers, with optional extensible authentication protocol (EAP)-type subfield |

TABLE 1-continued

| Parameter Name | Description |
| --- | --- |
| Roaming consortium list | list of information about a roaming consortium and/or subscription service providers (SSPs) whose networks are accessible via a wireless AP |
| $3^{rd}$ generation partnership project (3GPP) cellular network information | Public land mobile network (PLMN) identifiers are already established for cellular operators, including mobile country codes (MCC)-mobile network codes (MNC) values |
| Domain name list | Domain name(s) of a wireless AP operator |
| NAI home realm query | A list of reachable NAI realms that match a list in a client device's query |
| Network access related parameter(s) | |
| Access network type | Six options: private, private with guess access, chargeable public, free public, personal, emergency services only |
| Internet | Set when a wireless AP provides access to the Internet |
| Network authentication type information | An additional step used for authentication, such as "acceptance of terms and conditions" with a redirect uniform resource locator (URL) |
| Internet protocol (IP) address type availability | Reports support for IP version 4, network address translation, or IP version 6 |
| Connection capability | A list of protocols, ports and open/closed |
| Information related parameter(s) | |
| Venue group | 1 of 11 codes for "assembly," "business," "educational," "factory and industrial," etc. |
| Venue type | The International Building Code defines a number of venue types for each venue group. For example, educational group has types "school, primary," "school, secondary," "university or college," etc. |
| Venus name | A text field indicating the owner/occupier and address of the venue |
| Operator friendly name | A variable-length string identifying the operator of the wireless AP |

Although Table 1 describes a plurality of example network performance parameters, it should be understood that other network performance parameters may also be used.

Processor 102 may identify at least one network performance parameter to be used as a criterion for wireless AP selection based on the selected connection plan. For example, when first connection plan 112 is selected, processor 102 may identify data rate as a criterion for wireless AP selection. Processor 102 may identify a first data rate value from first network performance data 122 and a second data rate value from second network performance data 124. Processor 102 may compare the first data rate value to the second data rate value.

When the first data rate value is higher than the second data rate value, processor 102 may determine that first wireless AP 116 is the wireless AP to connect to. Processor 102 may establish a network connection between computing device 100 and first wireless AP 116 via wireless communication device 106. When the second data rate value is higher than the first data rate value, processor 102 may determine that second wireless AP 118 is the wireless AP to connect to. Processor 102 may establish a network connection between computing device 100 and second wireless AP 118 via wireless communication device 106.

As another example, when second connection plan 114 is selected, processor 102 may identify transmission power as a criterion for wireless AP selection. Processor 102 may identify a first value of the transmission power from first network performance data 122 and a second value of the transmission power from second network performance data 124. Processor 102 may compare the first value to the second value.

When the first value is lower than the second value, processor 102 may determine that first wireless AP 116 is the wireless AP to connect to. Thus, a network connection may be established with first wireless AP 116. When the second value is lower than the first value, processor 102 may determine that second wireless AP 118 is the wireless AP to connect to. Thus, a network connection may be established with second wireless AP 118.

In some examples, each network performance parameter may be assigned a distinct priority based on the connection plan selected. Processor 102 may compare values of the network performance parameters in descending priority order. For example, when first connection plan 112 is selected, data rate may have a first priority (e.g., highest priority) and signal strength indicator may have a second priority that is lower than the first priority. Processor 102 may compare values of data rate between first network performance data 122 and second network performance data 124 first as data rate has the first priority. Processor 102 may determine that the wireless AP having the higher data rate value is the wireless AP to connect to. When the values of data rate are equal, processor 102 may values of signal strength indicator between first network performance data 122 and second network performance data 124 as a tie breaker. Processor 102 may determine that the wireless AP with the higher signal strength indicator value is the wireless AP to connect to.

As another example, when second connection plan 114 is selected, transmission power may have the first priority and data rate may have a priority that is lower than the first priority. Thus, priority of each network performance parameter may change depending on which connection plan is selected.

Figure 2:
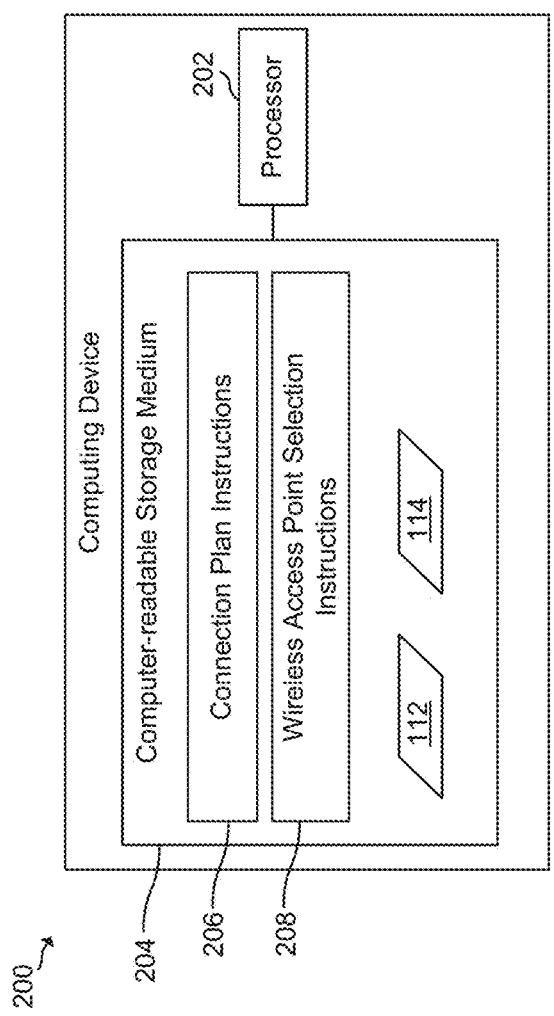
FIG. 2 is a block diagram of another example computing device for providing connection plans to a user.

FIG. 2 is a block diagram of another example computing device 200 for providing connection plans to a user. Computing device 200 may be similar to computing device 100 of FIG. 1. Computing device 200 may include a processor 202 and a computer-readable storage medium 204. Processor 202 may be similar to processor 102. Processor 202 may fetch, decode, and execute instructions 206 and 208 to provide a connection plan to a user and establish a network connection with a wireless AP based on a selected connection plan. As an alternative or in addition to retrieving and executing instructions; processor 202 may include at least one electronic circuit that includes electronic components for performing the functionality of instructions 206, 208, or a combination thereof.

Computer-readable storage medium 204 may be any electronic, magnetic, optical, or other physical storage device that contains or stores executable instructions. Thus, computer-readable storage medium 204 may be, for example, Random Access Memory (RAM), an Electrically Erasable Programmable Read-Only Memory (EEPROM), a storage device, an optical disc, etc. In some examples, computer-readable storage medium 204 may be a non-transitory storage medium, where the term "non-transitory" does not encompass transitory propagating signals. As described in detail below, computer-readable storage medium 204 may be encoded with a series of processor executable instructions 206 and 208 for providing a connection plan to a user and establishing a network connection with a selected wireless AP based on a selected connection plan. Computer-readable storage medium 204 may also be used to store connection plans, such as connection plans 112 and 114.

Connection plan instructions 206 may provide connection plans, such as connection plans 212 and 214, to a user via a display, such as display 104. In some examples, connection plan instructions 206 may modify a connection plan based on user input. For example, first connection plan 112 may indicate that data rate and signal strength indicator are network performance parameters that are used to select a wireless AP. Connection plan instructions 206 may generate a connection plan modification graphical user interface (GUI). Using the connection plan modification GUI, a user, such as user 110, may provide plan adjustment input to modify first connection plan 112, second connection plan 114, or a combination thereof. For example, the user may modify first connection plan 112 via a graphical user interface (GUI) so that data rate and channel frequency are the network performance parameters used to select a wireless AP. Connection plan instructions 206 may store the modified first connection plan 112 to computer-readable storage medium 204.

In some examples, connection plan instructions 206 may provide a connection plan creation GUI to a user so that a customized connection plan may be created based on user input. The connection plan creation GUI may enable a user to determine at least one network performance parameter used as a criterion for wireless AP selection. For example, the user may specify a threshold value of a network performance parameter to be satisfied for wireless AP selection. The user may specify a name or a description of the connection plan. The user may create a set of rules for wireless AP selection by selecting at least one network performance parameter to be used and entering a value of the selected network performance parameter into the connection plan creation GUI. In some examples, connection plan instructions 206 may import connection plans from a remote source, such as another computing device. Connection plan instructions 206 may also export connection plans stored in computer-readable storage medium 204 to a remote source.

Wireless access point selection instructions 208 may select a wireless AP based on a selected connection plan. Wireless access point selection instructions 208 may also establish with a selected wireless AP. Based on a selected connection plan, wireless access point selection instructions 208 may identify at least one network performance parameter, such as network performance parameters in Table 1. Wireless access point selection instructions 208 may compare values of identified network performance parameters from network performance data of available wireless APs to determine a wireless AP to connect to. In some examples, the wireless AP having the highest values of particular network performance parameters may be selected. In some examples, the wireless AP having the lowest values of particular network performance parameters may be selected. In some examples, the wireless AP having the most network performance parameters that satisfy different thresholds may be selected. In some examples, the wireless AP having network performance data that satisfy multiple network performance data parameters that are identified based on a selected connection plan may be selected.

Figure 3:
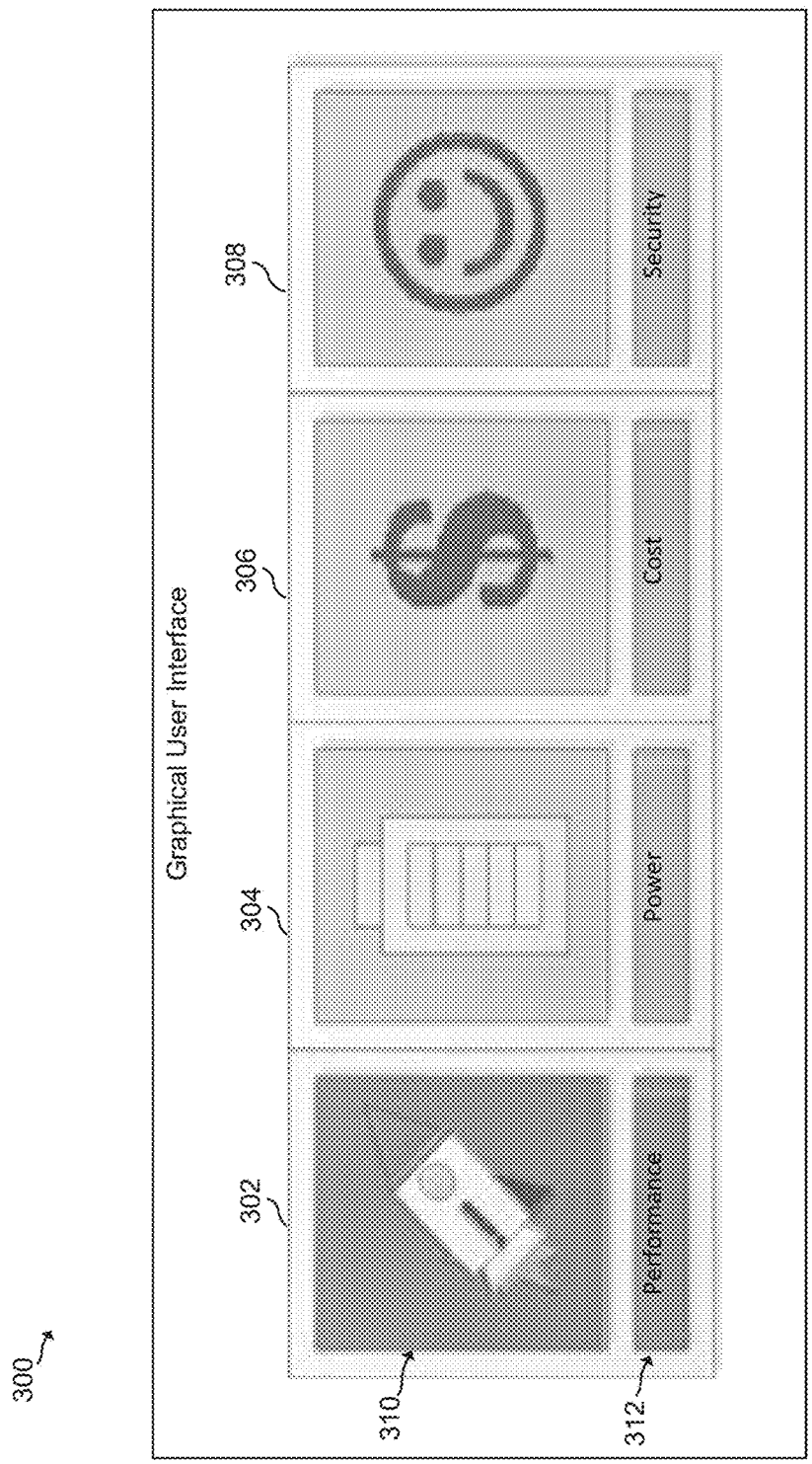
FIG. 3 is an example graphical user interface to provide connection plans to a user.

FIG. 3 is an example graphical user interface (GUI) 300 to provide connection plans to a user. GUI 300 may include a plurality of icons or widgets. For example, GUI 300 may include a first icon 302, a second icon 304, a third icon 306, and a fourth icon 308. Each icon 302-308 may correspond to a distinct connection plan. For example, first icon 302 may correspond to a connection plan that is performance oriented, such as first connection plan 112 of FIG. 1. Thus, when first icon 302 is selected by a user, a wireless AP that offers the highest data rate among available wireless APs may be selected. Second icon 304 may correspond to a connection plan that is power oriented. Thus, when second icon 304 is selected by a user, a wireless AP that takes the least amount of transmission power among available wireless APs may be selected.

Third icon 306 may correspond to a connection plan that is cost oriented. Thus, when third icon 306 is selected by a user, a wireless AP that costs the least (e.g., in terms of monetary cost) among available wireless APs may be selected. Fourth icon 308 may correspond to a connection plan that is security oriented. Thus, when fourth icon 308 is selected, a wireless AP that offers the highest level of encryption among available wireless APs may be selected. In some examples, graphical representations and texts may be used to distinguish each connection plan. For example, first icon 302 may include a graphical representation 310 of a rocket and a description 312 that indicates performance. Thus, graphical representation 310 and description 312 may indicate to a user that the user may select first icon 302 when fast transmission speed is desired.

Figure 4:
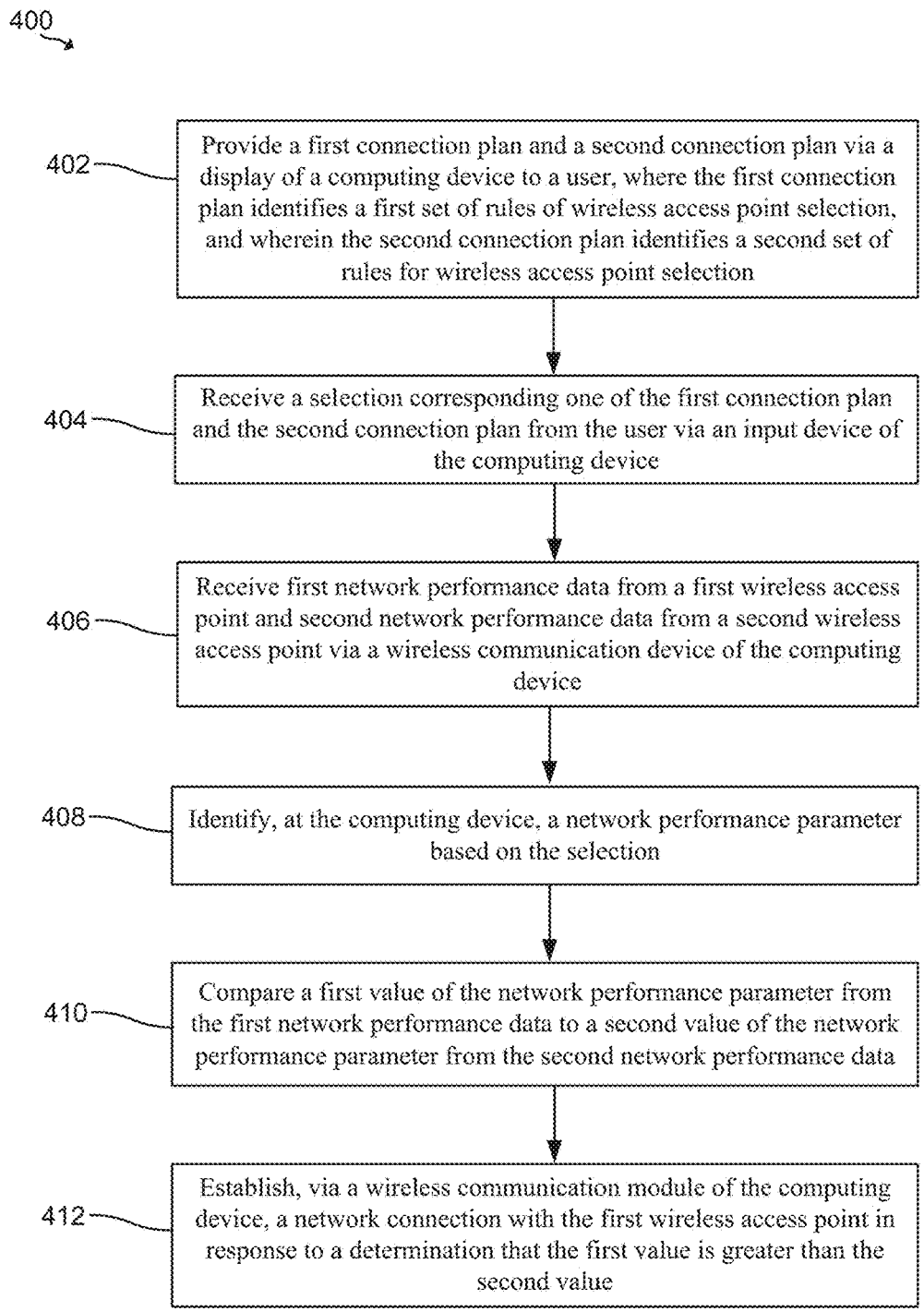
FIG. 4 is a flowchart illustrating an example method of a computing device for providing connection plans to a user.

FIG. 4 is a flowchart illustrating an example method 400 of a computing device for providing connection plans to a user. Method 400 may be implemented by computing device 100 of FIG. 1 or computing device 200 of FIG. 2. Method 400 includes providing a first connection plan and a second connection plan via a display of a computing device to a user, where the first connection plan identifies a first set of rules of wireless access point selection, and where the second connection plan identifies a second set of rules for wireless access point selection, at 402. For example, referring to FIG. 1, computing device 100 may provide a plurality of connection plans, such as a first connection plan 112 and a second connection plan 114, to user 110 via display 104.

Method 400 also includes receiving a selection corresponding one of the first connection plan and the second connection plan from the user via an input device of the computing device, at 404. For example, referring to FIG. 1, selection data 120 corresponding to connection plan selection of user 110 may be transmitted from input device 108 to processor 102.

Method 400 further includes receiving first network performance data from a first wireless access point and second network performance data from a second wireless access point via a wireless communication device of the computing device, at 406. For example, referring to FIG. 1, wireless APs 116 and 118 may transmit network performance data 122 and 124 respectively to computing device 100 as beacon messages.

Method 400 further includes identifying, at the computing device, a network performance parameter based on the selection, at 408. For example, referring to FIG. 1, processor 102 may identify at least one network performance parameter to be used as a criterion for wireless AP selection based on the selected connection plan.

Method 400 further includes comparing a first value of the network performance parameter from the first network performance data to a second value of the network performance parameter from the second network performance data, at 410. For example, referring to FIG. 1, processor 102 may identify a first data rate value from first network performance data 122 and a second data rate value from second network performance data 124. Processor 102 may compare the first data rate value to the second data rate value.

Method 400 further includes establishing, via a wireless communication module of the computing device, a network connection with the first wireless access point in response to a determination that the first value is greater than the second value, at 412. For example, referring to FIG. 1, when the first data rate value is higher than the second data rate value, processor 102 may determine that first wireless AP 116 is the wireless AP to connect to. Processor 102 may establish a network connection between computing device 100 and first wireless AP 116 via wireless communication device 106.

The use of "comprising", "including" or "having" are synonymous and variations thereof herein are meant to be inclusive or open-ended and do not exclude additional unrecited elements or method steps.

What is claimed is:

1. A system comprising:
    a wireless communication device;
    an input device;
    a display;
    a hardware processor; and
    a non-transitory machine-readable storage medium encoded with instructions executable by the hardware processor to perform a method comprising:
        provide a plurality of connection plans, including a first connection plan and a second connection plan, via the display to a user, each of the plurality of connection plans including a set of rules, wherein the first connection plan identifies a first set of rules of wireless access point selection, wherein the second connection plan identifies a second, different set of rules for wireless access point selection, and wherein each set of rules indicates a set of priorities for a plurality of network performance parameters for application in wireless access point selection;
        receive a selection corresponding to one of the plurality of connection plans from the user via the input device;
        receive network performance data from a plurality of wireless access points that are in communication range of the system, including a first set of network performance data for a first wireless access point, and a second set of network performance data for a second wireless access point;
        evaluate the network performance data for the plurality of wireless access points according to the set of priorities for the plurality of network performance parameters for the selected connection plan;
        select one of the plurality of wireless access points for the user based at least in part on the evaluation of the network performance data; and
        establish a network connection with the selected wireless access point for the user via the wireless communication device.

2. The system of claim 1, wherein the plurality of connection plans are independent of any wireless access point of the plurality of wireless access points.

3. The system of claim 1, the method further comprising:
    identify, from the network performance data, a value of each of the network performance parameters for each of plurality of wireless access points; and
    compare the values of each of the plurality of network performance parameters for each of the plurality of wireless access points according to the set of priorities;
    wherein the selected wireless access point is selected based on the comparison of network performance parameter values.

4. The system of claim 1, the method further comprising:
receive plan adjustment input from the user via the input device; and
modify, based on the plan adjustment input, at least one of the plurality of connection plans.

5. The system of claim 1, the method further comprising:
receive a selection of a network performance parameter of the plurality of network performance parameters from the user;
receive a value for the selected network performance parameter from the user; and
generate a new connection plan based at least in part on the selected network performance parameter and the selected value for the selected network performance parameter.

6. The system of claim 1, wherein the plurality of network performance parameters comprises one or more of:
a base station subsystem (BSS) load element;
an operation class;
a wide area network (WAN) metric;
a data rate;
a channel frequency; and
a channel type.

7. A non-transitory machine-readable storage medium encoded with instructions executable by a hardware processor of a computing component, the machine-readable storage medium comprising instructions to cause the hardware processor to perform a method comprising:
provide a plurality of connection plans, including a first connection plan and a second connection plan via a display to a user, each of the plurality of connection plans including a set of rules, wherein the first connection plan identifies a first set of rules of wireless access point selection, wherein the second connection plan identifies a second, different set of rules for wireless access point selection, and wherein each set of rules indicates a set of priorities for a plurality of network performance parameters for application in wireless access point selection;
receive a selection corresponding to one of the plurality of connection plans from the user via an input device;
receive network performance data from a plurality of wireless access points that are in communication range, including a first set of network performance data for a first wireless access point, and a second set of network performance data for a second wireless access point;
evaluate the network performance data for the plurality of wireless access points according to the set of priorities for the plurality of network performance parameters for the selected connection plan;
select one of the plurality of wireless access points for the user based at least in part on the evaluation of the network performance data; and
establish a network connection with a selected wireless access point for the user via a wireless communication device.

8. The medium of claim 7, wherein the plurality of connection plans are independent of any wireless access point of the plurality of wireless access points.

9. The medium of claim 7, the method further comprising:
identify, from the network performance data, a value of each of the network performance parameters for each of plurality of wireless access points; and
compare the values of each of the plurality of network performance parameters for each of the plurality of wireless access points according to the set of priorities;
wherein the selected wireless access point is selected based on the comparison of network performance parameter values.

10. The medium of claim 7, the method further comprising:
receive plan adjustment input from the user via the input device; and
modify, based on the plan adjustment input, at least one of the plurality of connection plans.

11. The medium of claim 7, the method further comprising:
receive a selection of a network performance parameter of the plurality of network performance parameters from the user;
receive a value for the selected network performance parameter from the user; and
generate a new connection plan based at least in part on the selected network performance parameter and the selected value for the network performance parameter.

12. The medium of claim 7, wherein the plurality of network performance parameters comprises one of more of:
a base station subsystem (BSS) load element;
an operation class;
a wide area network (WAN) metric;
a data rate;
a channel frequency; and
a channel type.

13. A method comprising:
providing a plurality of connection plans, including a first connection plan and a second connection plan via a display to a user, each of the plurality of connection plans including a set of rules, wherein the first connection plan identifies a first set of rules of wireless access point selection, wherein the second connection plan identifies a second, different set of rules for wireless access point selection, and wherein each set of rules indicates a set of priorities for a plurality of network performance parameters for application in wireless access point selection;
receiving a selection corresponding to one of the plurality of connection plans from the user via an input device;
receiving network performance data from a plurality of wireless access points that are in communication range, including a first set of network performance data for a first wireless access point, and a second set of network performance data for a second wireless access point;
evaluating the network performance data for the plurality of wireless access points according to the set of priorities for the plurality of network performance parameters for the selected connection plan;
selecting one of the plurality of wireless access points for the user based at least in part on the evaluation of the network performance data; and
establishing a network connection with a selected wireless access point for the user via a wireless communication device.

14. The method of claim 13, wherein the plurality connection plans are independent of any wireless access point of the plurality of wireless access points.

15. The method of claim 13, further comprising:
identifying, from the network performance data, a value of each of the network performance parameters for each of plurality of wireless access points; and
comparing the values of each of the plurality of network performance parameters for each of the plurality of wireless access points according to the set of priorities;

wherein the selected wireless access point is selected based on the comparison of network performance parameter values.

16. The method of claim 13, further comprising:
receiving plan adjustment input from the user via the input device; and
modifying, based on the plan adjustment input, at least one of the plurality of connection plans.

17. The method of claim 13, further comprising:
receiving a selection of a network performance parameter of the plurality of network performance parameters from the user;
receiving a value for the selected network performance parameter from the user; and
generating a new connection plan based at least in part on the selected network performance parameter and the selected value for the network performance parameter.

18. The method of claim 13, wherein the plurality of network performance parameters comprises one of more of:
a base station subsystem (BSS) load element;
an operation class;
a wide area network (WAN) metric;
a data rate;
a channel frequency; and
a channel type.

* * * * *